United States Patent [19]

Swanson

[11] 4,327,540
[45] May 4, 1982

[54] HEADER HEIGHT CONTROL FOR A COTTON HARVESTER

[75] Inventor: William C. Swanson, Clarendon Hills, Ill.

[73] Assignee: International Harvester Company, Chicago, Ill.

[21] Appl. No.: 210,983

[22] Filed: Nov. 28, 1980

[51] Int. Cl.³ .......................................... A01D 69/00
[52] U.S. Cl. .................................... 56/11.9; 56/10.2; 56/DIG. 11; 56/DIG. 15
[58] Field of Search ...................... 56/10.2, 11.9, 208, 56/DIG. 10, DIG. 11, DIG. 15, 28-50

[56] References Cited

U.S. PATENT DOCUMENTS

| | | | |
|---|---|---|---|
| 2,949,924 | 8/1960 | Cochran | 137/99 |
| 4,197,690 | 4/1980 | Eistert et al. | 56/10.2 |
| 4,197,694 | 4/1980 | Hagie et al. | 56/10.2 |
| 4,203,275 | 5/1980 | Vermeer | 56/208 |

FOREIGN PATENT DOCUMENTS

| | | | |
|---|---|---|---|
| 2555283 | 6/1977 | Fed. Rep. of Germany | 56/10.2 |
| 54-682167 | 8/1979 | Japan | 56/11.9 |

*Primary Examiner*—Robert A. Hafer
*Attorney, Agent, or Firm*—J. W. Gaines; F. D. AuBuchon

[57] ABSTRACT

A cotton harvester is provided with a hydraulic system incorporating a multiple segment rotary flow divider interposed between a source of fluid pressure and a plurality of header unit lift cylinders. A variable orifice valve assembly is arranged parallel to the header unit lift cylinders and is responsive to undulations in the ground plane for raising and lowering individual header units.

11 Claims, 3 Drawing Figures

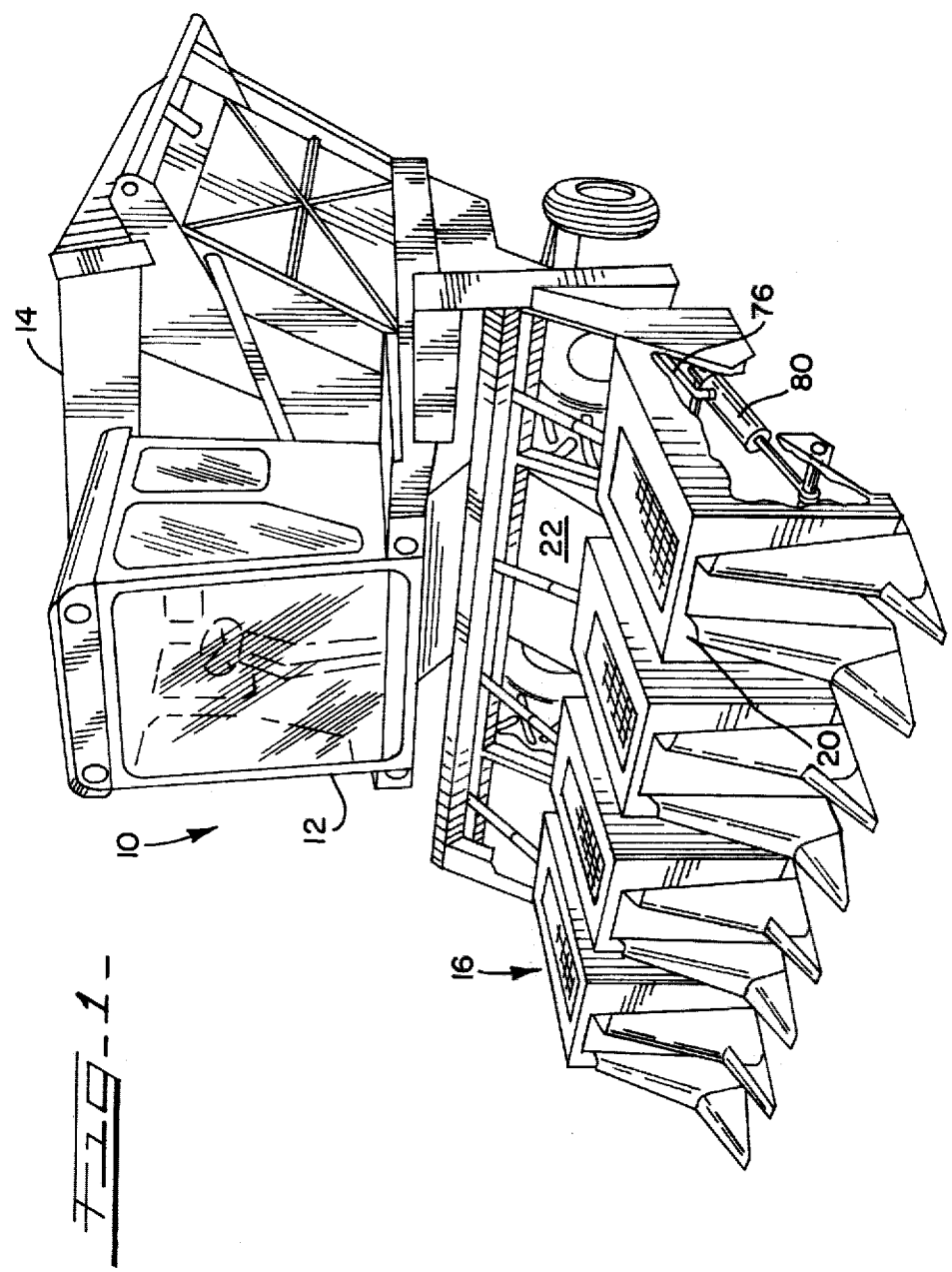

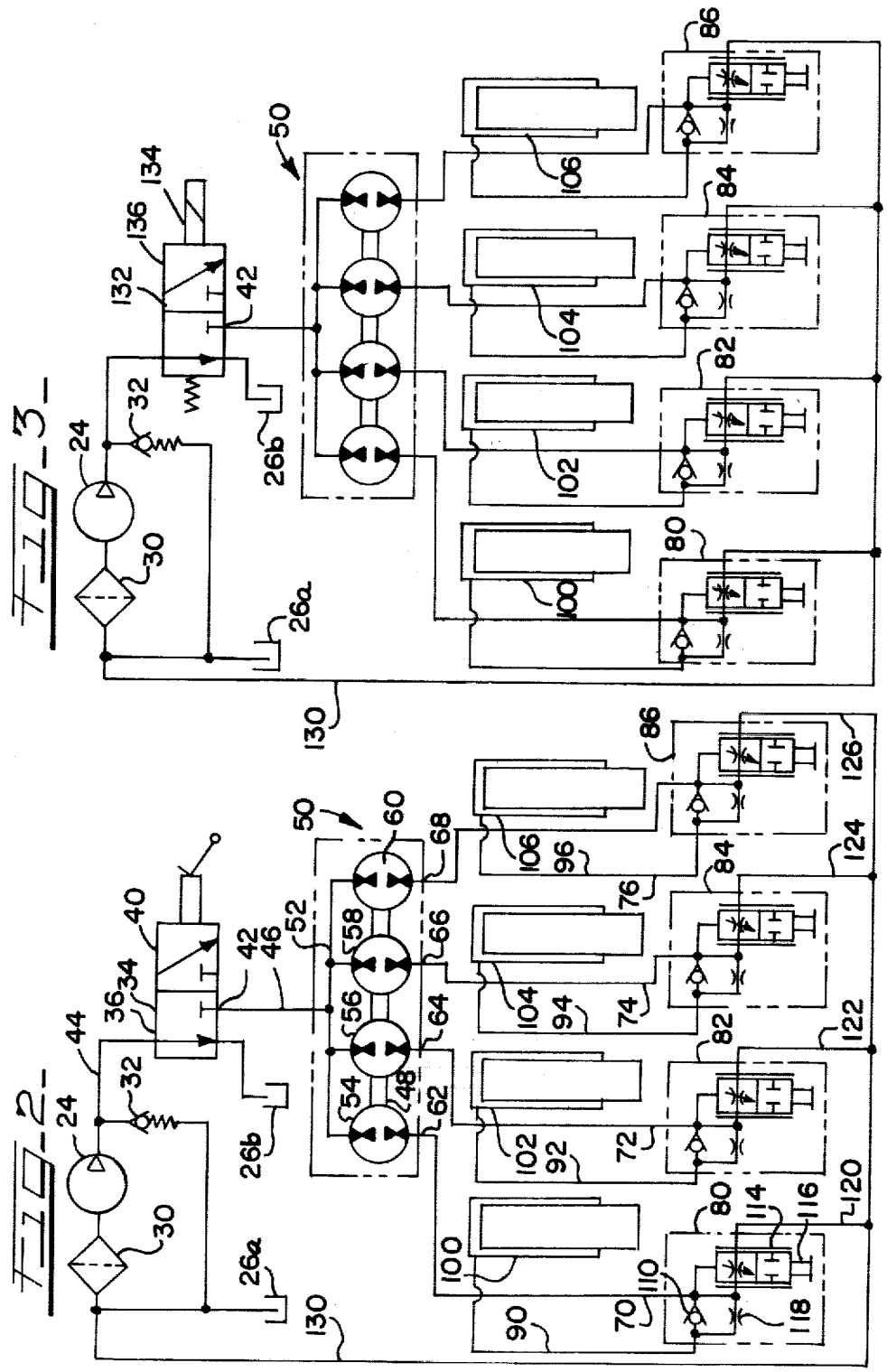

HEADER HEIGHT CONTROL FOR A COTTON HARVESTER

CROSS-REFERENCES TO RELATED APPLICATIONS

This application is related to application Ser. No. 210,983 filed Nov. 28, 1980, titled "Header Height Position Control For A Cotton Harvester" and application Ser. No. 210,986 filed Nov. 28, 1980 titled "Improved Header Height Position Control For A Cotton Harvester."

BACKGROUND OF THE INVENTION

1. Field of the Invention

This invention is concerned with crop harvesting machines having front mounted header units for gathering a crop. The specific invention set forth herein is related to a hydraulic control system incorporating a rotary flow divider to balance the raising and lowering action of independently suspended header units. Individual header unit height is controlled through ground elevation variation sensing devices for each independent header unit.

2. Description of the Prior Art

Crop harvesting vehicles, specifically cotton harvesters, that is both cotton strippers and cotton picking machines, are known to be equipped with front mounted gathering units or header units that will remove the cotton crop from the cotton plants as the harvester moves through the field. The automatic height sensing devices now in use incorporate a ground sensing shoe that is connected through a linkage to a header unit lift valve. The header unit lift valve is an open or closed valve that will supply hydraulic fluid under pressure to the cylinder associated with the header unit whereby extension of the cylinder rod will cause the header unit to be raised or lowered responsive to the ground elevation plane.

SUMMARY OF THE INVENTION

A cotton harvester with a plurality of front mounted crop gathering harvesting headers is provided with a hydraulic circuit and control system that improves the ability of the header unit to follow the ground contour over which the cotton harvester is being driven. Each harvesting unit or header unit is a self-contained unit independently controlled to be raised and lowered responsive to the undulations in the terrain over which the cotton harvester is being driven while harvesting. The cotton harvester includes a source of hydraulic fluid, typically a hydraulic pump, which is used to provide fluid under pressure to raise the header unit while the weight of the unit will cause a discharge of fluid from the associated header unit cylinder when the fluid source is diverted through the indexing of a control valve.

The hydraulic fluid will be delivered to the header units through a manual or solenoid operated control valve that will be operated when it is desired that all header units be raised or lowered in unison. Between the manual control valve and the header units there is a rotary flow divider having typically one fluid distribution pump/motor for each header unit of the cotton harvester. A terrain responsive variable orifice valve is associated with each header unit and will allow the metered opening of the return line port of the hydraulic cylinder associated with that particular header unit. In a first embodiment of this invention a manually operated control valve system is presented while in a second embodiment a solenoid operated control valve is presented.

It is among the objects of this invention to provide a cotton harvester header unit control system that will allow the raising and lowering of the header units at a uniform rate when the control valve of the units is manipulated by the harvester operator to either raise or lower the header units.

It is a further object of this invention to provide for continuous independent adjustments of each header unit while having the ability to raise all the units simultaneously at the command of the vehicle operator. Each row unit has a height sensing shoe that follows the contour of the ground and automatically keeps each header unit working at a predetermined optimum stripping height. This relieves the operator of constantly riding the height control levers to maintain the proper stripping height while assuring the operator of getting more cotton with minimum dirt and trash.

BRIEF DESCRIPTION OF THE DRAWING FIGURES

The above objects and advantages of this invention will be apparent from a careful perusal of this specification in conjunction with an examination of the drawing figures wherein:

FIG. 1 is a pictorial view of a cotton harvester having a portion of one header unit removed to expose the header unit lift cylinder;

FIG. 2 is a hydraulic schematic showing a preferred embodiment of the invention; and FIG. 3 is a hydraulic schematic similar to that shown in FIG. 2 incorporating a solenoid operated control valve.

DETAILED DESCRIPTION OF THE INVENTION

FIG. 1 shows a typical cotton harvester, generally (10) having an operator's compartment (12) and a crop retention basket (14) into which the harvested cotton is delivered.

A crop gathering device generally (16) is carried on the front portion of the cotton harvester and is comprised of a plurality of header units such as (20). In the embodiment illustrated four header units are shown, each unit delivering its harvested product through a delivery chute (22) for eventual accumulation in the crop retention basket (14).

Each header unit (20), more commonly a stripper unit on the stripper type cotton harvester shown, is a brush roll type unit. There may be a plurality of the header units per machine with a cross auger connecting the header units. The stripping units consist of two stripper rolls arranged generally parallel to each other, of alternating rubber flaps and nylon brushes, drive gear boxes and shafts.

In the stripper operation the machine is driven through the cotton field causing cotton plants to enter the front of the header units where they are positioned and gathered by the gatherers. The brush rolls strip the cotton plant of the open cotton as well as of the green bolls. The harvested material is then conveyed to the cross auger by the header unit augers where it is moved from each header unit to the center chute (22) by the cross auger and delivered to the air stream. The cotton is separated from the trash by the air stream and is blown into the crop retention basket while the green bolls fall into a boll box.

The invention is concerned with a hydraulic system used to raise and lower the header units as the cotton harvester is driven through the field.

As can be seen in the drawing figures, a source of fluid pressure is provided by the pump (24) that draws hydraulic fluid from a reservoir (26a) or from the filter (30) and its source. The pump (24) is of such capacity to enable it to provide total flow requirements of all the header units during simultaneous movements. A manually controlled two-position valve is shown in FIG. 2 interposed between the pump (24) and the rotary flow divider generally (50).

A manual control valve (34) includes a first section that passes pump flow to the reservoir (26b) while blocking the work port (42) thus preventing flow from the pump through first supply line (44) to the second supply line (46). When the manual control valve is in a second position (40) the work port (42) is communicating with the first supply line such that pump output can be delivered to the second supply line (46). The spring bias check valve (32) is provided to relieve excess pump pressure to the reservoir (26a).

The hydraulic fluid flow from the pump (24) is delivered through first and second supply lines (44 and 46) to a distribution manifold (52) and the rotary flow divider generally (50). The distribution manifold (52) hydraulically communicates with each of the gear pumps (54, 56, 58 and 60) of the rotary flow divider. The multiple gear pumps are interconnected by means of a common shaft (48) and four fluid outlet ports (62, 64, 66 and 68). The rotary flow divider generally (50) is a hydraulic fluid control device having multiple equal displacement segments. Each segment is made up of a gear type or vane type fluid transfer device that can act either as a pump or a motor depending on the flow through the rotary flow divider and the pressure at the outlet ports of the rotary flow divider. The pump elements are interconnected to each other on the common shaft (48) to rotate synchronously. The volume of fluid flowing through the rotary flow divider will always be equalized although the pressure at one or more of the orifices may be intensified.

A typical rotary flow divider is shown in U.S. Pat. No. 2,949,924 issued to A. M. Cochran, Jr. A pair of vane type fluid transfer devices are used in the Cochran invention although gear type—as used in gear type hydraulic pumps—are also used in rotary flow dividers. Each fluid transfer device or segment is capable of functioning as a bidirectional pump when the shaft (48) is rotated and capable of functioning as a bidirectional motor when the flow of hydraulic fluid is directed therethrough. The outlet ports (62, 64, 66 and 68) are connected through sensing unit supply lines (70, 72, 74 and 76) to hydraulic ground elevation sensing units (80, 82, 84 and 86). The fluid flow will pass out of the hydraulic ground elevation sensing units and through lift cylinder supply lines (90, 92, 94 and 96) respectively to their associated single acting lift cylinder (100, 102, 104 and 106). Each lift cylinder is pivotally mounted between the crop gathering device and one of each of the independently pivoted header units. All the lift cylinders are similar with each having hydraulic ground elevation sensing units (80, 82, 84 and 86).

Each hydraulic ground sensing unit includes a lift cylinder check valve (110) (all hydraulic ground elevation sensing units are identical) interposed between the sensing unit supply line (70) and the lift cylinder supply line (90) such that fluid can pass from the rotary flow divider generally (50) to the lift cylinder such as (100). A metering orifice (118) of fixed capacity is connected in parallel with the lift cylinder check valve (110) and allows fluid to flow in either direction but will create a pressure drop when fluid flows from the single acting lift cylinder (100) as the lift cylinder check valve (110) will be seated.

For a simplification of the discussion in the preferred embodiment only one lift cylinder and hydraulic ground elevation sensing unit will be described in detail. Of the four single acting lift cylinders and hydraulic ground elevation sensing units presented, all are identical in function and operating method.

Connected in parallel with each lift cylinder such as (100) and part of the hydraulic ground elevation sensing unit (80) is a variable orifice valve assembly (114) comprised of a ground variation sensor (116) (symbolically represented, but more typically including a ground contact plate hinged to the header unit to follow the contour of the ground) directly linked to, for instance, the spool of the variable orifice valve assembly (114). The variable orifice valve assembly could be one of several types of variable orifice valves with the preferred embodiment shown.

The variable orifice valve assembly (114) hydraulically communicates with the sensing unit supply line (70) and a discharge conduit (120, 122, 124 and 126) which is hydraulically connected to a return line (130) passing generally from the hydraulic ground elevation sensing units to the fluid reservoir system which includes the filter (30), reservoir (26a), pump (24) and high pressure relief valve (32).

In operation the actuating flow is supplied by the pump (24) with enough capacity equal to the total flow requirements of all the lift cylinders (100, 102, 104 and 106). The pump flow is directed through the two position three way valve (34) that is manually controlled. During normal harvesting operations the pump flow is diverted from the reservoir to the rotary flow divider by positioning the manual control valve (34) such that work port (42) is aligned with first supply line (44). The pump flow is equally divided by the gear sets in the rotary flow divider generally (50) and is distributed through the outlet ports (62, 64, 66 and 68) onto each unit lift cylinder (100, 102, 104 and 106). The variable orifices such as (114) are actuated by the ground variation feeler (116). As the machine moves forward the ground feeler will seek a position of the orifice (114) to generate enough back pressure from the fixed flow to balance the mass of the header unit connected to the lift cylinder (100).

When an obstruction is encountered the ground variation sensor (116) will cause the variable orifice valve assembly (114) to reduce the orifice size raising the pressure in the lift cylinder (100) to overcome the unit balance pressure. Part of the flow is diverted to the lift cylinder and raises the unit to a height for a new balance pressure.

Conversely, as the ground plane falls away lowering will take place. The variable orifice (114) will increase, the balance pressure will decay, the header unit weight acting on the hydraulic cylinder (100) forces some fluid out through the orifice (114) and the unit lowers to a new balance position. This operation will take place as long as the control valve (34) is in the second position represented by the second section of the valve assembly (40).

The advantage of using the rotary flow divider generally (50) is that all of the crop gathering header units will receive hydraulic fluid at an equal rate when necessary and no single unit will dominate or take preference over the others. As the variable orifice valve assemblies such as (114) are always open to some degree when the cotton harvester is being driven through a field with the header unit lowered, the rotary flow divider gear pump segments will always be turning. If one of the single acting lift cylinders (100, 102, 104 or 106) has balanced its load, hydraulic fluid in the conduit manifold (52) will still continue to the other outlet port (and the rotary flow divider segment) with the least back pressure. The flow requirement at this outlet port will then be satisfied rapidly without depriving its mates of fluid flow. When all the header units are balanced the excess flow will be evenly distributed and exhausted through the open variable orifices through the discharge conduits (120, 122, 124 and 126) and the return line (130). If all the header units, specifically their associated ground variation sensors (116) encounter a depression or an obstruction in the ground elevation, they will all fall or rise at the same rate.

FIG. 3 presents a modified embodiment of the hydraulic system shown in FIG. 2. The modification simply is the substitution of a solenoid operated valve (132) for the manually operated valve (34) shown in FIG. 2. All the other elements of the hydraulic system and the header unit position control system, the rotary flow divider are identical to that shown in FIG. 2. The operation will be the same except that the solenoid operated valve would be wired into an electrical source possibly remote from the vehicle cab. Identical reference figures are used in FIG. 3 for the identical components shown in FIG. 2.

The inventor contemplates that this header height control system could also be used on other types of harvesting equipment having header units that would benefit by being independently raised or lowered during harvesting. For instance the header units of a corn harvesting machine would readily adapt to the above disclosed system.

Thus it can be shown that there has been provided a header unit lifting and raising circuit for use on a cotton harvester that meets the objects and advantages set forth above. Two embodiments of the invention have been described, however, the inventor contemplates that various nuances of design are possible and such design nuances as fairly fit within the broad scope of the appended claims are contemplated.

What is claimed is:

1. In a crop harvesting machine having a crop gathering device and a source of hydraulic fluid, the improvement comprising:
   a plurality of independent pivotally mounted header units attached to said crop gathering device;
   a number of positive displacement single acting lift cylinders attached at one end to said crop gathering device and at the other end to one of each of said pivotally mounted header units;
   a two position control valve hydraulically communicating with said source of hydraulic fluid;
   a rotary flow divider hydraulically communicating with said two position control valve and having relative to said lift cylinder number a like number of positive displacement sections;
   a plurality of hydraulic ground elevation sensing units hydraulically communicating with one each of said number of positive displacement sections of said rotary flow divider and one each of said like number of positive displacement single acting lift cylinders, said hydraulic ground elevation sensing units metering hydraulic fluid flow to said single acting lift cylinders for controlling the position of the individual pivotally mounted header units concerned; and
   a return line providing hydraulic fluid communication from each of said hydraulic ground elevation sensing units to said source of hydraulic fluid enabling the equally divided flow as it is supplied from each of the number of positive displacement flow divider sections to be handled by the combined consumption of that positive displacement single acting cylinder and sensing unit associated with that particular section.

2. In a crop harvesting machine having a crop gathering device and a source of hydraulic fluid, the improvement comprising:
   a plurality of independent pivotally mounted header units attached to said crop gathering device;
   a plurality of single acting lift cylinders attached at one end to said crop gathering device and at the other end to one of each of said pivotally mounted header units;
   a two position control valve hydraulically communicating with said source of hydraulic fluid;
   a rotary flow divider hydraulically communicating with said two position control valve;
   a plurality of hydraulic ground elevation sensing units hydraulically communicating with said rotary flow divider and one each of said plurality of single acting lift cylinders, said hydraulic ground elevation sensing units metering hydraulic fluid flow to said single acting lift cylinders for controlling the position of said pivotally mounted header units; and
   a return line providing hydraulic fluid communication from each of said plurality of hydraulic ground elevation sensing units to said source of hydraulic fluid, characterized wherein said plurality of hydraulic ground elevation sensing units each comprise:
   a lift cylinder check valve allowing fluid flow from said rotary flow divider to said single acting lift cylinders and restricing flow from said single acting lift cylinders;
   a metering orifice located between said rotary flow divider and said single acting lift cylinders restricting the amount of fluid flow passing therebetween;
   a variable orifice valve assembly interposed between said rotary flow divider and said return line for selectively controlling the amount of fluid flow from said rotary flow divider to said return line; and
   a ground variation sensor mechanically cooperating with said variable orifice valve assembly for adjusting said variable orifice valve assembly responsive to undulations in ground plane elevation.

3. The invention in accordance with claim 2 wherein said rotary flow divider comprises:
   a distribution manifold for receiving fluid from said two position control valve;

a plurality of gear pump elements corresponding to the number of said independent pivotally mounted header units;

a common shaft connecting each of said gear pump elements together so that said gear pump elements will be caused to move in unison; and a plurality of outlet ports corresponding in number to the number of said gear pump elements of said rotary flow divider.

4. The invention in accordance with claim 3 wherein said rotary flow divider has a number of gear pump elements corresponding to the number of lift cylinders of said crop gathering device.

5. The invention in accordance with claim 3 wherein said rotary flow divider has a number of gear pump elements greater than the number of lift cylinders of said crop gathering device.

6. The invention in accordance with claim 3 wherein said rotary flow divider has a number of gear pump elements being a multiple of the number of lift cylinders of said crop gathering device.

7. In a crop harvesting machine having a crop gathering device and a source of hydraulic fluid, the improvement comprising:

a plurality of independent pivotally mounted header units attached to said crop gathering device;

a plurality of single acting lift cylinders attached at one end to said crop gathering device and at the other end to one of each of said pivotally mounted header units;

a two position control valve hydraulically communicating with said source of hydraulic fluid;

a rotary flow divider hydraulically communicating with said two position control valve;

a plurality of hydraulic ground elevation sensing units hydraulically communicating with said rotary flow divider and one each of said plurality of single acting lift cylinders, said hydraulical ground elevation sensing units metering hydraulic fluid flow to said single acting lift cylinders for controlling the position of said pivotally mounted header units; and a return line providing hydraulic fluid communication from each of said plurality of hydraulic ground elevation sensing units to said source of hydraulic fluid, characterized wherein said plurality of hydraulic ground elevation sensing units each comprise:

a lift cylinder check valve allowing fluid flow from said rotary flow divider to said single acting lift cylinders and restricting flow from said single acting lift cylinders;

a metering orifice located between said rotary flow divider and said single acting lift cylinders restricting the amount of fluid flow passing therebetween;

a variable orifice valve assembly interposed between said rotary flow divider and said return line for selectively controlling the amount of fluid flow from said rotary flow divider to said return line; and a ground variation sensor mechanically cooperating with said variable orifice valve assembly for adjusting said variable orifice valve assembly responsive to undulations in ground plane elevation.

8. The invention in accordance with claim 7 wherein said rotary flow divider comprises:

a distribution manifold for receiving fluid from said two position control valve;

a plurality of vane type pump elements corresponding to the number of said independent pivotally mounted header units;

a common shaft connecting each of said vane type pump elements together so that said vane type pump elements will be caused to move in unison; and a plurality of outlet ports corresponding in number to the number of said vane type pump elements of said rotary flow divider.

9. The invention in accordance with claim 8 wherein said rotary flow divider has a number of vane type pump elements corresponding to the number of lift cylinders of said crop gathering device.

10. The invention in accordance with claim 8 wherein said rotary flow divider has a number of vane type pump elements greater than the number of cylinders of said crop gathering device.

11. The invention in accordance with claim 8 wherein said rotary flow divider has a number of vane type pump elements being a multiple of the number of lift cylinders of said crop gathering device.

* * * * *